May 11, 1943.　　　K. R. OLOFSON　　　2,319,084
SAFETY DEVICE
Filed July 13, 1939　　　2 Sheets-Sheet 1
FIG. 1
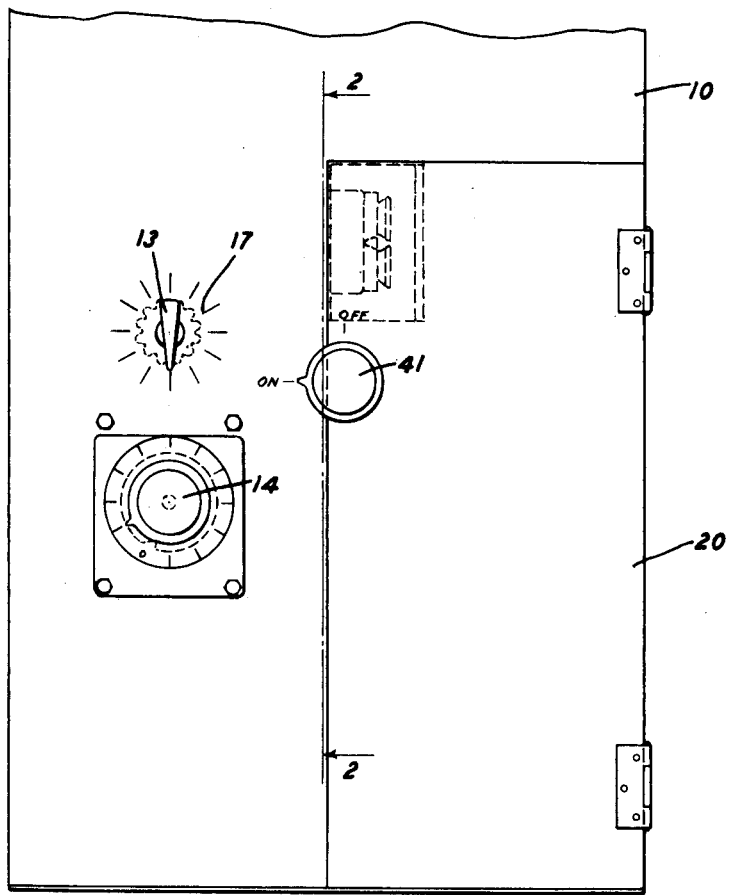
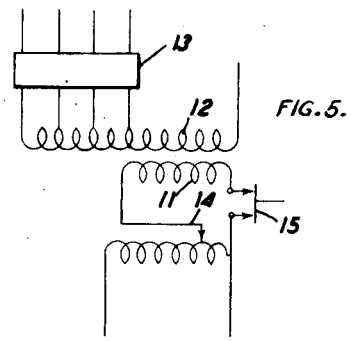
FIG. 5.
INVENTOR
K. R. OLOFSON
BY
E. R. Nowlan
ATTORNEY

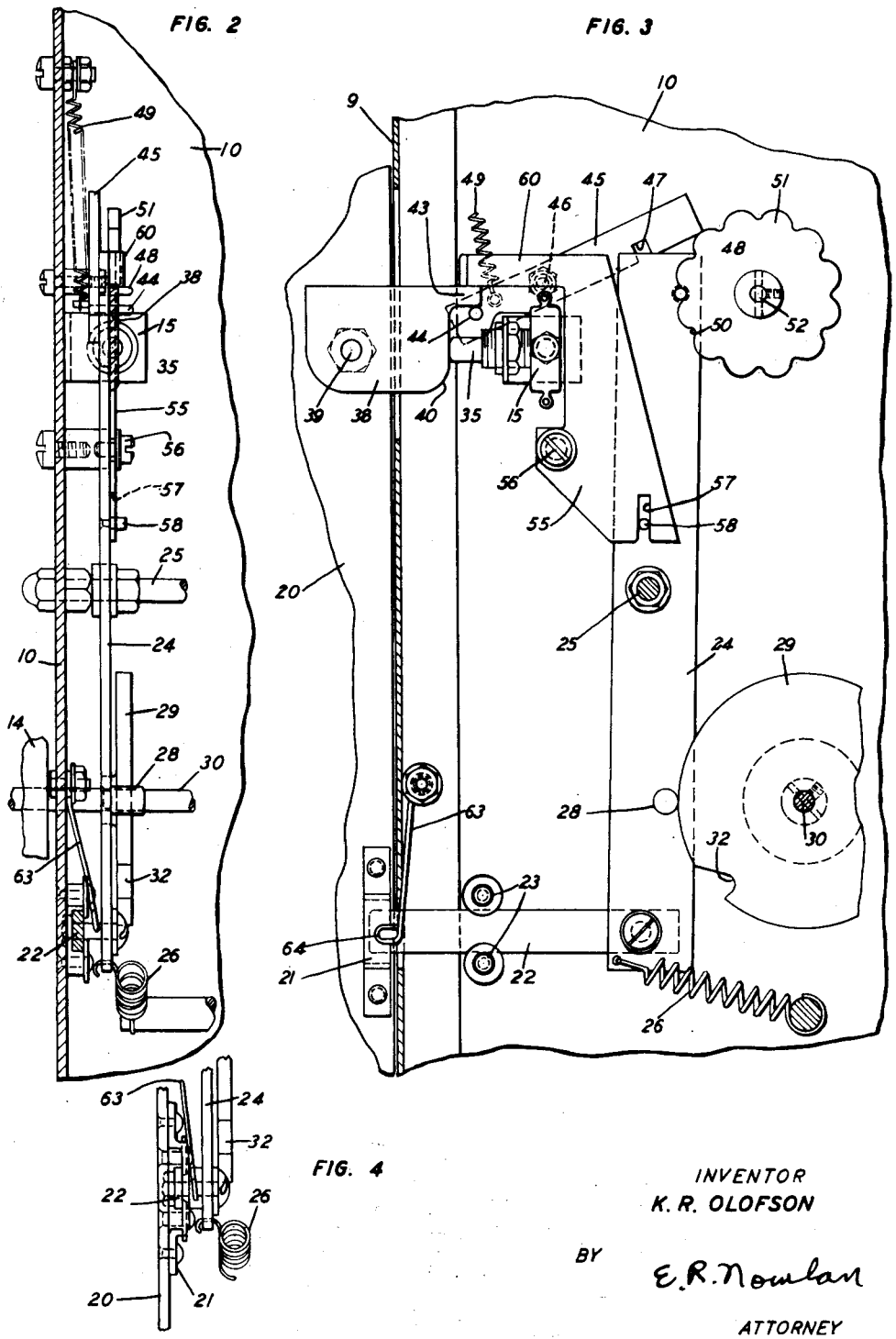

Patented May 11, 1943

2,319,084

UNITED STATES PATENT OFFICE 2,319,084

SAFETY DEVICE

Karl R. Olofson, Laurelton, Long Island, N. Y., assignor to Western Electric Company, Incorporated, New York, N. Y., a corporation of New York Application July 13, 1939, Serial No. 284,175

8 Claims. (Cl. 200—50)

This invention relates to safety devices, and more particularly to safety devices for use with high tension electrical testing apparatus.

Electrical testing apparatus using high voltage currents are frequently disposed in casings as a safety measure but other safety measures, such as the prevention of access to the interior of such a casing until the high voltage circuits are opened or the voltage therein reduced beyond danger, the rendering of the means for closing such circuits inoperable while access is available to the interior of such a casing, and the locking of such a casing against access to the interior thereof through the closing of a circuit therein or the increasing of the voltage in such circuits, are believed of great importance.

An object of the invention is to provide a simple, efficient and practical safety device, particularly for use with high tension electrical testing apparatus.

With this and other objects in view, the invention comprises a safety device, associated with circuit controlling elements of an electrical apparatus disposed in a casing, including mechanism to maintain a door to the casing locked in closed position until the electrical energy in the circuit is reduced to a minimum and the circuit opened, and to lock certain of the units against closing the circuit or introducing increased voltage into the circuit while the door is open.

Other objects and advantages will be apparent from the following detailed description when taken in conjunction with the accompanying drawings, wherein Fig. 1 is a fragmentary front elevational view of a casing for an electrical testing apparatus embodying the invention;

Fig. 2 is a vertical sectional view taken substantially along the line 2—2 of Fig. 1;

Fig. 3 is a fragmentary detailed view of the safety mechanism looking from the inside of the casing;

Fig. 4 is a fragmentary detailed view of the locking mechanism shown in the lower portion of Fig. 2 but in a different position, and Fig. 5 is a simple wiring diagram to illustrate one form of testing circuit.

Referring now to the drawings, numeral 10 designates a casing having a partition 9 forming a compartment in the casing for an electrical testing apparatus, that is, for housing various electrical elements, such as a transformer having a primary winding 11 and a secondary winding 12, a selector switch 13, a potentiometer or variable auto-transformer 14, and a door switch 15.

There may be more than one electrical circuit disposed in the casing and numerous other electrical elements may be included in this or other circuits, but to illustrate the invention only one circuit is shown and those electrical units directly controlled by the safety mechanism are illustrated.

In Fig. 1 the hand controlled elements of the selector switch 13 and the potentiometer 14 are shown but to simplify the disclosure the same reference numerals 13 and 14 are applied thereto. In the present embodiment the selector switch 13 is capable of introducing into the circuit different electrical energies which may be selected from its various positions illustrated by the indications 17. These indications are shown only as marks on the drawings but at each indication a different electrical energy introduced into the circuit may be indicated. For example, throughout these different positions of the selector switch it is possible to introduce into the circuit electrical current and potentials from 30 to 90 volts, 20 cycles, from 3 to 2500 volts, 60 cycles, and from 2 to 430 volts D. C. These different electrical energies may be varied from zero potential to their maximum through the potentiometer 14.

Referring now to the safety mechanism, attention is directed to Fig. 3, which shows a door 20 for the casing having a latch receiving member 21 mounted thereon. A latch 22 guided in its movement by rollers 23 or the like is conditioned to pass through an aperture in the partition and be receivable in the member 21 to lock the door 20 in closed position. The inner end of the latch 22 is pivotally mounted upon the lower end of an actuating lever 24, pivoted at 25 and normally urged counterclockwise by a tension spring 26 tending to move the latch 22 free of the member 21. A pin 28 carried by the lever 24 is positioned to ride upon a cam 29 fixedly mounted upon a shaft 30 of the potentiometer 14. The cam 29 has one notch or low point 32 in its periphery positioned to be disposed in registration with the pin 28 when the potentiometer 14 has been returned to zero or neutral position. Therefore, the remaining surface of the cam 29 engaging the pin 28 maintains the latch 22 in closed position with respect to the member 21 until the potentiometer 14 is returned to its zero position.

The switch 15 shown in Figs. 3 and 4 is of the make contact type, having a plunger 35 normally urged outwardly to open the circuit. A lock 38, pivotally mounted at 39 on the door 20 and movable through an aperture in the partition 9, has a cam surface 40 formed so as to engage the plunger 35 of the switch 15 to close the switch when moved into the locked position shown in Fig. 3. A knob 41 fixed to the pivot 39 provides means for manually actuating the lock 38. A projection 43 of the lock 38 is positioned to engage a pin 44 of a lever locking element 45 pivoted at 46 and having a notch 47 therein to receive a pin 48 carried by the lever 24 when the element is free to be moved by a spring 49.

The portion of the pin 48 engaged by the element 45 is disposed upon one side of the lever 24, while another portion thereof extends through the lever and is receivable in recesses 50 of a holding element 51 fixedly mounted upon a shaft 52 of the selector switch 13. There is provided one recess 50 for each position of the selector switch.

Means is provided to hold the lock 38 in closed position, shown in Fig. 3, which includes a lock retaining element 55 pivoted at 56 and operatively connected to the lever 24 through an elongate slot 57 associated with a pin 58 carried by the lever. The element 55 has a projection 60 bent at right angles at its outer end to extend across and in engagement with the projection 43 of the lock 38 to hold the lock against movement out of closed position until the potentiometer 14 is moved to zero position to allow movement of the lever 24.

A further precaution is provided in positioning a spring arm 63 so as to normally move in front of the free end of the latch 22 when the latch is in open position, to further prevent movement of the potentiometer when the door 20 is open, the spring arm 63 being assisted by the partition 9 in holding the latch and having a projection 64 positioned to be engaged by the member 21 and moved free of the latch when the door is closed.

Upon considering the operation of the safety device, let it be assumed that the circuit is closed, the selector switch 13 positioned to introduce a chosen electrical energy into the circuit, and the potentiometer positioned to control that electrical energy to determine the output of the transformer to an article under test. If the operator wishes to gain access to the interior of the casing it is first necessary that the potentiometer be moved to zero or neutral position to move the low point 32 of the cam 29 into registration with the pin 28. When this has been accomplished the force of the spring 26 will move the lever 24 about its pivot 25, moving the pin 28 into the notch 32 and moving the latch 22 free of the member 21, thus removing one locking means from the door.

Movement of the lever 24 will also cause movement of the element 55 about its pivot 56 through association of the pin 58 with the elongate slot 57, moving the projection 60 free of the lock 38, that is, free of the projection 43 of the lock, thus conditioning the lock to be opened by the operator. When the lock 38 is rotated into open position to free the door for opening, the projection 43 is moved free of the pin 44, allowing the spring 49 to move the lever locking element 45 about its pivot 46 to cause the notch 47 to move over the pin 48 which at that time, due to the movement of the lever 24, will be positioned in arcuate alignment with the notch 47.

The mechanism is now in open position so far as the door 20 and the selector switch 13 are concerned, but is in closed position as far as the potentiometer 14 is concerned, locking the potentiometer against movement to cause an increase in voltage in the circuit that is the primary circuit of the transformer. The selector switch may at this time be actuated to condition the circuit when again closed to receive a different electrical energy for performing another, or other, test on articles. The safety mechanism thus prevents changing of electrical energies other than through the potentiometer when the circuit is closed, eliminating the possibility of damaging the electrical apparatus under test as well as the circuit itself.

When the door is open the latch 22 is held against movement to the left, Fig. 3, by the arm 63. The potentiometer is locked against movement by the pin 28 in the notch 32, the pin 28 being held therein by the lever locking element 45 which, due to its engagement with the pin 48, prevents movement of the lever to free the pin 28.

After the selector switch 13 has been moved into a desired position the door 20 may be moved into closed position, causing the member 21 to engage the projection 64 of the arm 63, moving the latter free of the latch 22. Although the door is closed the circuit remains open and the potentiometer remains locked against movement out of zero position until the lock 38 is moved into closed position. As soon as this has been done, that is, as soon as the lock is moved into the position shown in Fig. 3, the switch 15 is closed, due to the engagement of the cam portion 40 with the plunger 35, the projection 43 engaging the pin 44 in the movement of the lock 38 into closed position, causing movement of the element 45 to free the pin 48. At this point in the operation of the safety mechanism the circuit is closed and the selector switch is positioned to introduce another desired potential into the circuit, yet this potential is negative or held at a minimum due to the potentiometer 14 being in its zero position. Therefore, although the door is closed and locked and the circuit is closed the electrical energy in the circuit is maintained negative or at a minimum until the lock is secured against opening. However, upon movement of the potentiometer 14 to increase the potential in the circuit the pin 28 is forced outwardly and caused to ride upon the high portion of the cam 29, immediately moving the lever 24 about its pivot and against the force of the spring 26, moving the latch 22 into closed position in registration with the member 21, moving the pin 48 into one of the recesses 50 to lock the selector switch against movement and cause actuation of the element 55 to move the projection 60 thereof into intimate engagement with the projection 43 of the lock 38, rigidly holding the lock against movement as long as the potentiometer is in any effective position, that is, any position other than zero position.

The safety mechanism, therefore, renders the electrical energy varying means, such as the selector switch, ineffective for introducing electrical energies other than the one selected into the circuit while the circuit is closed. The mechanism eliminates the possibility of maintaining high voltages or voltages of any appreciable value in the circuit while the door is open for access to the casing. The mechanism further makes necessary the reduction of the voltage in the circuit to negative or to a minimum before the door to the casing can be opened. The mechanism further provides a triple lock for the door, one in the form of the latch 22, another in the form of the lock 38, and still another in the form of the positive means 55 to retain the lock against movement into open position as long as the circuit is closed and the potentiometer has been moved from zero position. The mechanism further provides a locking means effective to lock the potentiometer into zero position when the various locking means for the door have been released for the opening of the door.

The embodiment of the invention herein disclosed is illustrative only and may be modified and departed from in many ways without departing from the spirit and scope of the invention as pointed out in and limited only by the appended claims.

What is claimed is:

1. A safety device for a door of a casing comprising a lock for the door movable into open and closed positions to respectively free the door for opening and lock the door in closed position, a normally open electrical circuit in the casing adapted to receive an electrical energy when the circuit is closed, an element having neutral and effective positions, the latter to vary the electrical energy in the circuit, an electrical switch included in the circuit and movable to open and close the circuit by the respective movements of the lock into open and closed positions, and means controlled by the element to hold the lock in closed position when the element is out of neutral position.

2. A safety device for a door of a casing comprising a lock for the door movable into open and closed positions to respectively free the door for opening and lock the door in closed position, a normally open electrical circuit in the casing adapted to receive an electrical energy when the circuit is closed, an element having neutral and effective positions, the latter to vary the electrical energy in the circuit, an electrical switch included in the circuit and movable to open and close the circuit by the respective movements of the lock into open and closed positions, means controlled by the element to hold the lock in closed position when the element is out of neutral position, and means effective to render the holding means ineffective upon movement of the element into neutral position.

3. A safety device for a door of a casing comprising a lock for the door movable into open and closed positions to respectively free the door for opening and lock the door in closed position, a normally open electrical circuit in the casing adapted to receive an electrical energy when the circuit is closed, an element having neutral and effective positions, the latter to vary the electrical energy in the circuit, an electrical switch included in the circuit and movable to open and close the circuit by the respective movements of the lock into open and closed positions, and means to hold the element in neutral position upon movement of the lock into open position.

4. A safety device for a door of a casing comprising a lock for the door rotatable into open and closed positions to respectively free the door for opening and lock the door in closed position, an electrical switch movable into open and closed positions by the respective rotation of the lock into open and closed positions, and means disposed in the casing and adapted to hold the lock against rotation into open position.

5. A safety device for a door of a casing comprising a lock for the door movable into open and closed positions to respectively free the door for opening and lock the door in closed position, a variable electrical circuit in the casing adapted to receive an electrical energy when the circuit is closed, and means under the control of the lock and actuable when the lock is in open position to cause variation in the circuit.

6. A safety device for a door of a casing comprising a lock for the door movable into open and closed positions to respectively free the door for opening and lock the door in closed position, a variable electrical circuit in the casing adapted to receive an electrical energy when the circuit is closed, means under the control of the lock and actuable only when the lock is in open position to cause variation in the circuit, and an electrical switch included in the circuit and movable to open and close the circuit by respective movements of the lock into open and closed positions.

7. A safety device for a door of a casing comprising a lock for the door movable into open and closed positions to respectively free the door for opening and lock the door in closed position, a variable electrical circuit in the casing adapted to receive an electrical energy when the circuit is closed, means actuable only when the lock is in open position to cause variation in the circuit, an element disposed in the casing and having neutral and effective positions, the latter adapted to vary the electrical energy in the circuit, an electrical switch included in the circuit and movable to open and close the circuit by the respective movements of the lock into open and closed positions, and means controlled by the element to hold the lock in closed position when the element is out of neutral position.

8. A safety device for a door of a casing comprising a latch for the door movable into open and closed positions to respectively free the door for opening and latch the door in the closed position, a variable electrical circuit disposed in the casing, an electrical element disposed in the casing and controlled externally of the casing for movement into a neutral and effective positions to vary the said circuit, means adapted to move the latch into open position when the element is in its neutral position, a member adapted to hold the element in its neutral position, and means actuable to hold the latch in its open position to maintain the holding member effective to hold the element and actuable by the door when moved into closed position to free the latch.

KARL R. OLOFSON.